United States Patent
Furuzono et al.

(10) Patent No.: US 11,345,600 B2
(45) Date of Patent: May 31, 2022

(54) CARBON NANOTUBE LIQUID DISPERSION, AND METHOD FOR PRODUCING SAME

(71) Applicant: NITTA CORPORATION, Osaka (JP)

(72) Inventors: Tomohiro Furuzono, Osaka (JP); Takuji Komukai, Osaka (JP)

(73) Assignee: NITTA CORPORATION, Osaka (JP)

( * ) Notice: Subject to any disclaimer, the term of this patent is extended or adjusted under 35 U.S.C. 154(b) by 217 days.

(21) Appl. No.: 16/760,708

(22) PCT Filed: Oct. 22, 2018

(86) PCT No.: PCT/JP2018/039139
§ 371 (c)(1),
(2) Date: Apr. 30, 2020

(87) PCT Pub. No.: WO2019/087837
PCT Pub. Date: May 9, 2019

(65) Prior Publication Data
US 2020/0331757 A1    Oct. 22, 2020

(30) Foreign Application Priority Data
Oct. 30, 2017 (JP) .............................. JP2017-209824

(51) Int. Cl.
*C01B 32/174* (2017.01)
*B02C 7/175* (2006.01)
(Continued)

(52) U.S. Cl.
CPC ............ *C01B 32/174* (2017.08); *B02C 7/175* (2013.01); *B82Y 30/00* (2013.01); *B82Y 40/00* (2013.01);
(Continued)

(58) Field of Classification Search
CPC . C01B 32/174; C01B 2202/34; C01B 32/158; C01B 32/159; C01B 32/16;
(Continued)

(56) References Cited

U.S. PATENT DOCUMENTS 6,783,746 B1 *    8/2004    Zhang .................... B82Y 30/00
                                                                208/14

FOREIGN PATENT DOCUMENTS

| JP | 2011-517009 A | 5/2011 |
| JP | 2012-240889 A | 12/2012 |

(Continued)

OTHER PUBLICATIONS

Graf, et al., Large scale, selective dispersion of long single-walled carbon nanotubes with high photoluminescence quantum yield by shear force mixing, Carbon 2016; 105: 593-599 (Year: 2016).*
(Continued)

*Primary Examiner* — Daniel C. McCracken
(74) *Attorney, Agent, or Firm* — Osha Bergman Watanabe & Burton LLP (57) ABSTRACT

A CNT dispersion includes a dispersion medium, and a nanocarbon material containing carbon nanotubes dispersed in the dispersion medium. 98% or more of the nanocarbon material has a length of 1 μm or more and 105 μm or less and the nanocarbon material has an average aspect ratio of 100 or more and 20000 or less.

6 Claims, 4 Drawing Sheets

(51) Int. Cl.
 *B82Y 30/00* (2011.01)
 *B82Y 40/00* (2011.01)

(52) U.S. Cl.
 CPC ...... *C01B 2202/34* (2013.01); *C01P 2004/02* (2013.01); *C01P 2004/54* (2013.01)

(58) Field of Classification Search
 CPC ... C01B 32/162; C01B 32/164; C01B 32/166; C01B 32/168; C01B 32/17; C01B 32/172; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/36; B02C 7/175; B02C 7/00; B82Y 30/00; B82Y 40/00; C01P 2004/02; C01P 2004/54; C01P 2004/61; C01P 2006/42; Y02P 80/30; H01B 1/24; H01B 13/00; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
 See application file for complete search history.

(56) References Cited

FOREIGN PATENT DOCUMENTS

| JP | 2014-500212 A | 1/2014 |
| JP | 2015-013772 A | 1/2015 |
| JP | 2016-094323 A | 5/2016 |
| JP | 5924103 B2 | 5/2016 |
| JP | 2017-065964 A | 4/2017 |
| WO | 2012/060454 A1 | 5/2012 |

OTHER PUBLICATIONS

International Search Report issued in corresponding International Application No. PCT/JP2018/039139 dated Nov. 13, 2018 (5 pages).
Written Opinion of the International Searching Authority issued in corresponding International Application No. PCT/JP2018/039139 dated Nov. 13, 2018 (3 pages).

\* cited by examiner

CARBON NANOTUBE LIQUID DISPERSION, AND METHOD FOR PRODUCING SAME

TECHNICAL FIELD

The present invention relates to a carbon nanotube dispersion and a method for producing the same.

BACKGROUND ART

Carbon nanotubes (hereinafter referred to as CNTs) are a type of nanocarbon material that can impart functions such as electrical conductivity and thermal conductivity to a desired member, and are used in various applications in the form of a CNT dispersion. When CNTs are dispersed in a dispersion medium such as water to obtain a CNT dispersion, it has been proposed to perform dispersion treatment using an ultrasonic homogenizer, a high-pressure homogenizer, or the like (for example, PTL 1).

Currently, commercially available nanocarbon materials composed of CNTs include CNT aggregates agglomerated in a bundle shape or a tangle shape. The bundle-shaped CNT aggregates have variations in length, thickness, and the like, and there are cases where elongated CNT aggregates having a length of more than 100 μm exist. In order to obtain a uniform CNT dispersion using a nanocarbon material containing such elongated CNT aggregates, it is necessary to repeat the dispersion treatment a plurality of times.

CITATION LIST

Patent Literature

PTL 1: Japanese Patent No. 5924103

SUMMARY OF INVENTION

Technical Problem

When the nanocarbon material containing the CNT aggregates is subjected to the dispersion treatment, the CNT aggregates are fibrillated, but the variations in length and thickness are increased. This is because the shorter the CNT aggregates are, the easier the CNT aggregates are loosened, and the longer the CNT aggregates are, the harder the CNT aggregates are loosened. The elongated CNT aggregates are shortened by repeating the dispersion treatment. Therefore, it is difficult to obtain a uniform CNT dispersion.

When a non-uniform CNT dispersion is used, it is difficult to uniformly exhibit characteristics such as electrical conductivity and thermal conductivity. For example, when used for forming a coating film, the elongated CNT aggregates present in the CNT dispersion become a foreign matter and exert an adverse effect. The nanocarbon material to be dispersed in the CNT dispersion is required to be such that the CNT aggregates are fibrillated as much as possible, the proportion of the elongated CNT aggregates is decreased, and the variation in length is suppressed.

Therefore, an object of the present invention is to provide a CNT dispersion in which a nanocarbon material having a large number of fibrillated CNT aggregates is dispersed with a small proportion of the length of more than 105 μm, and a method for producing the same.

Solution to Problem

A carbon nanotube dispersion according to the present invention includes a dispersion medium, and a nanocarbon material containing carbon nanotubes dispersed in the dispersion medium, wherein 98% or more of the nanocarbon material has a length of 1 μm or more and 105 μm or less and the nanocarbon material has an average aspect ratio of 100 or more and 20000 or less.

A method for producing a carbon nanotube dispersion according to the present invention includes performing a first dispersion treatment on a nanocarbon material containing an aggregates of carbon nanotubes to adjust a length of 95% or more of the nanocarbon material to 1 μm or more and 105 μm or less; and performing a second dispersion treatment on the nanocarbon material after the first dispersion treatment to loosen at least a part of the aggregates, wherein 98% or more of the obtained nanocarbon material has a length of 1 μm or more and 105 μm or less and the obtained nanocarbon material has an average aspect ratio of 100 or more and 20000 or less.

Advantageous Effects of Invention

In the present invention, when a CNT dispersion is produced using the nanocarbon material containing CNT aggregates, the length of the nanocarbon material is shortened to a predetermined range before at least a part of the CNT aggregates is loosened. The nano carbon material is easily loosened by adjusting the length of 95% or more thereof to 1 μm or more and 105 μm or less. The CNT aggregates are easily loosened by the subsequent treatment, and the occurrence of defects on the CNT surface is suppressed. When the CNT aggregates are loosened, the elongated nanocarbon material is shortened, and the nanocarbon material having a length of 1 μm or more and 105 μm or less accounts for 98% or more of the entire nanocarbon material.

In this manner, the CNT dispersion of the present invention in which a nanocarbon material having a large number of fibrillated CNT aggregates is dispersed with a small proportion of the length of more than 105 μm is obtained.

DESCRIPTION OF EMBODIMENTS

Hereinafter, embodiments of the present invention will be described in detail with reference to the drawings.

1. CNT Dispersion

In the CNT dispersion of the present embodiment (hereinafter, also simply referred to as a dispersion), a nanocarbon material composed of CNTs is dispersed in a dispersion medium. Most of the CNTs in the nanocarbon material are contained in a state in which the isolated and dispersed CNTs or CNT aggregates are loosened, but may be confirmed in a state of CNT aggregates. As the dispersion medium, for example, water can be used. 98% or more of the dispersed nanocarbon material has a length of 1 μm or more and 105 μm or less. The length of the nanocarbon material can be determined based on optical microscope observation.

Specifically, the length of the nanocarbon material confirmed in a predetermined region of an optical micrograph at a magnification of 1000 times is measured. Preferably, 95% or more of the nanocarbon material has a length of 90 μm or less, and more preferably 90% or more of the nanocarbon material has a length of 75 μm or less.

The diameter of the CNT is generally about 5 to 100 nm. When the length is 1 μm or more and 105 μm or less, the range of the aspect ratio of the CNT is calculated to be 10 or more and 21000 or less. In reality, the lower limit of the aspect ratio of CNTs may be about 100. In the present embodiment, since the length of 98% or more of the nanocarbon material is 1 μm or more and 105 μm or less, the average aspect ratio of the nanocarbon material is 100 or more and 20000 or less. In the description herein, the term "average aspect ratio" refers to a number average value of aspect ratios calculated for each nanocarbon material. The average aspect ratio can be calculated using a length obtained based on optical microscope observation and a diameter obtained by measuring a transmission electron microscope (TEM) photograph. The average aspect ratio of the nanocarbon material is preferably 4000 or more and 15000 or less.

The nanocarbon material preferably has a standard deviation of the length of about 40 μm or less. The standard deviation of the length can be calculated using the length of the nanocarbon material obtained based on microscopic observation. The small standard deviation indicates that the variation in length is suppressed. The standard deviation of the length of the nanocarbon material is more preferably 25 μm or less, and most preferably 20 μm or less.

As long as the above-described requirements are satisfied, the nanocarbon material in the dispersion of the present embodiment is not necessarily CNT isolated from one another by completely fibrillating the CNT aggregates, and the nanocarbon material may partially include CNT aggregates incompletely fibrillated.

In the CNT constituting the nanocarbon material, a first dispersion treatment is performed in advance as described later, so that the number of times of a second dispersion treatment can be reduced. Therefore, a decrease in the peak intensity ratio between the G-band and the D-band in the Raman spectrum (G/D ratio) is suppressed. The G/D ratio of the CNTs can be 1.0 or more. The CNTs having the G/D ratio of 1.0 or more have few defects and thus have excellent electrical characteristics. The G/D ratio is more preferably 1.05 or more, and most preferably 1.10 or more.

2. Production Method

As described above, commercially available nanocarbon materials include elongated CNT aggregates having a length of more than 105 μm. The elongated CNT aggregates having a length of more than 105 μm may account for 10% or more of the nanocarbon material.

The CNT dispersion of the present embodiment can be produced by the method of the present embodiment using a nanocarbon material containing such CNT aggregates. The production method of the present embodiment includes a first dispersion treatment of shortening the nanocarbon material to adjust the length within a predetermined range, and a second dispersion treatment of loosening at least a part of the CNT aggregates after the first dispersion treatment to increase the average aspect ratio of the nanocarbon material. As a result of the second dispersion treatment, the proportion of the nanocarbon material having a length within the predetermined range is increased. Hereinafter, each dispersion treatment will be described.

(First Dispersion Treatment)

The nanocarbon material containing the CNT aggregates is added to a liquid to prepare a sample to be subjected to the first dispersion treatment. As the liquid, for example, water, N-methyl-2-pyrrolidone, or the like can be used. The concentration of the nanocarbon material in the sample may be about 0.01 to 20% by mass. For example, about 0.05 to 125 g of the nanocarbon material is added to 500 g of water to prepare a sample.

In the first dispersion treatment, for example, a wet pulverizer such as a colloid mill (IKA Japan K.K., majic LAB) can be used. The first dispersion treatment is performed under appropriately selected conditions so that the length of 95% or more of the nanocarbon material is 1 μm or more and 105 μm or less. For example, in the case of a colloid mill, the treatment is performed at 3000 to 26000 rpm for 1 to 120 minutes with a gap of 10 to 300 μm. If it is difficult to introduce the sample, the sample can be introduced by using, for example, a pump (Heishin Ltd., Mohno Pump).

By performing the first dispersion treatment, the length of the CNT aggregates in the nanocarbon material is shortened and the variation in length is reduced (standard deviation: about 40 μm or less). When the length is shortened, the CNT aggregates are easily loosened. Depending on the conditions of the first dispersion treatment, the CNT aggregates may be shortened and loosened to reduce the thickness.

(Second Dispersion Treatment)

The nanocarbon material shortened by the first dispersion treatment is subjected to a high-pressure dispersion treatment using, for example, a high-pressure homogenizer, thereby loosening at least a part of the CNT aggregates (fibrillation treatment). If necessary, a resin such as polyvinyl alcohol (PVA) may be added to the sample to be subjected to the high-pressure dispersion treatment. The conditions of the high-pressure dispersion treatment, such as pressure, may be appropriately set. The high-pressure homogenizer is preferably provided with a flat nozzle having a flatness ratio of 0.1 or more and a short axis length of about 100 μm or less. The flatness ratio of the flat nozzle is more preferably 0.6 or more.

By performing the second dispersion treatment, at least a part of the CNT aggregates is loosened. Since the nanocarbon material is in a state in which the CNT aggregates are easily loosened by the preceding first dispersion treatment, it is not necessary to repeat the second dispersion treatment in order to loosen the CNT aggregates. The CNT aggregates are easily loosened without surface modification treatment, and the variations in length and thickness are suppressed. As a result, the average aspect ratio of the nanocarbon material becomes 100 or more and 20000 or less. At this time, the nanocarbon material having a length of more than 105 μm is shortened, and 98% or more of the nanocarbon material has a length of 1 μm or more and 105 μm or less.

(Optional Treatment)

After the second dispersion treatment, the dispersion may be diluted with a predetermined dispersion medium as necessary to obtain a CNT dispersion containing a nanocarbon material composed of CNTs at a predetermined concentration. Even after dilution, 98% or more of the nanocarbon material in the CNT dispersion has a length of 1 μm or more and 105 μm or less and the average aspect ratio of the nanocarbon material is 100 or more and 20000 or less. Such a CNT dispersion can be used for various applications such as formation of a conductive coating film.

For example, when the nanocarbon material satisfying the above-described requirements is used for a battery electrode, the nanocarbon material may be dispersed in water or N-methyl-2-pyrrolidone at a concentration of about 0.01 to 20% by mass.

3. Action and Effect

In the method for producing the CNT dispersion according to the present embodiment, first, since the length of 95% or more of the nanocarbon material containing the CNT aggregates is adjusted to 1 μm or more and 105 μm or less, the variation in length in the nanocarbon material is suppressed (first dispersion treatment). Since the nanocarbon material is shortened as a whole because the proportion of the nanocarbon material having a length of more than 105 μm is limited, the CNT aggregates contained therein are easily loosened.

The treatment for loosening the CNT aggregates (fibrillation treatment) tends to cause defects on the surface of the CNT. When elongated CNT aggregates that are difficult to be loosened are loosened to the same extent as shortened CNT aggregates by repeating the fibrillation treatment, defects on the CNT surface are increased. Defects on the CNT surface cause deterioration in electrical properties. By repeating the fibrillation treatment, the length of the elongated CNT aggregates is further shortened, and the variation in length of the CNT aggregates to be fibrillated is increased.

In the production method according to the present embodiment, since the CNT aggregates are in a state of being easily loosened in advance, the CNT aggregates can be easily loosened (second dispersion treatment). Cutting with a bead mill or surface modification treatment is not necessary, and the risk of increasing defects on the CNT surface is reduced. Therefore, the CNT constituting the nanocarbon material can have a G/D ratio in the Raman spectrum of 1.0 or more.

Since the CNT aggregates in which the variation in length is suppressed by performing the first dispersion treatment are fibrillated and loosened by the second dispersion treatment, the variations in length and thickness are suppressed. The average aspect ratio of the nanocarbon material is 100 or more and 20000 or less. At this time, the elongated nanocarbon material having a length of more than 105 μm is shortened, and 98% or more of the nanocarbon material has a length of 1 μm or more and 105 μm or less. Thus, the CNT dispersion of the present embodiment is obtained.

In the CNT dispersion according to the present embodiment, the length of 98% or more of the dispersed nanocarbon material is 1 μm or more and 105 μm or less, and the average aspect ratio of the nanocarbon material is 100 or more and 20000 or less. Since the nanocarbon material is uniformly dispersed in the CNT dispersion, functions such as electrical conductivity and thermal conductivity can be uniformly imparted to a desired member. In the CNT dispersion according to the present embodiment, since the proportion of the elongated CNT aggregates having a length of more than 105 μm is limited, it is possible to avoid a possibility of exerting an adverse effect when a function is imparted.

4. Examples

Hereinafter, the present invention will be described in detail with reference to Examples, but the present invention is not limited to the following Examples.

<Influence of First Dispersion Treatment>

Figure 1:
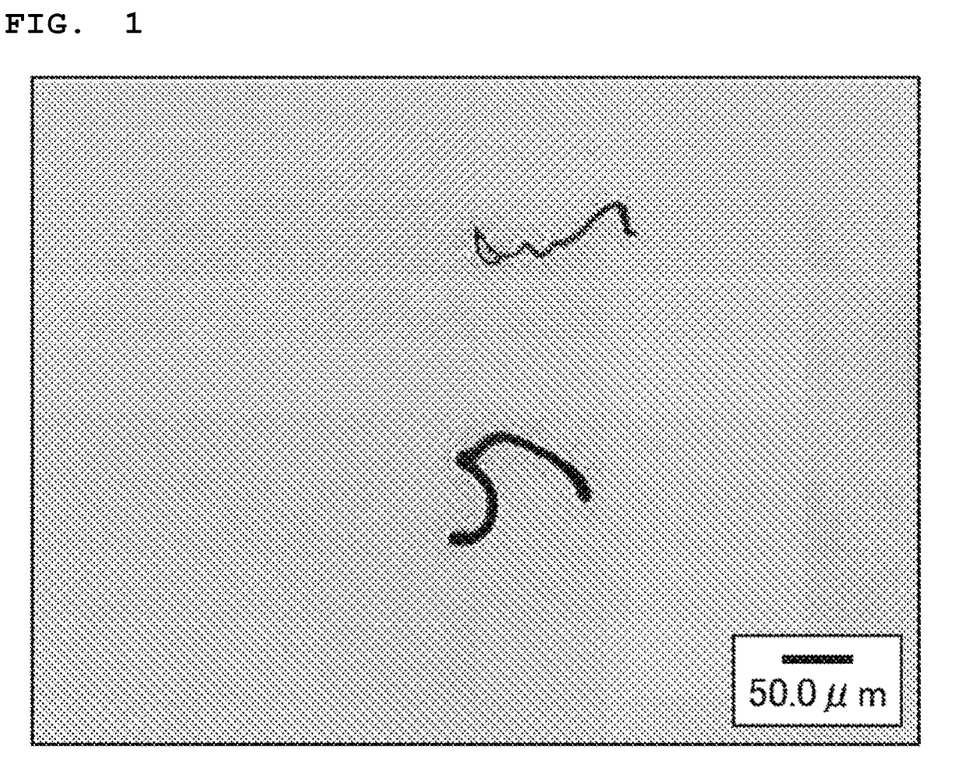
FIG. 1 is an optical micrograph of a commercially available nanocarbon material containing CNT aggregates.

First, a commercially available nanocarbon material is subjected to the first dispersion treatment, and the length after the dispersion treatment is examined. The nanocarbon material before the first dispersion treatment is composed of CNT aggregates. As shown in the optical micrograph of FIG. 1, some of the CNT aggregates have a length longer than 105 μm and a thickness of about 5 μm.

0.15 g of the nanocarbon material was added to 500 g of water to prepare a sample for performing the first dispersion treatment. A colloid mill (IKA Japan K.K., majic LAB) is used for the first dispersion treatment. The gap of the colloid mill was set to 40 μm, and the dispersion treatment was performed at 16000 rpm for a predetermined time. The treatment time was set to three types of 5 minutes, 10 minutes, and 30 minutes.

Figure 2:
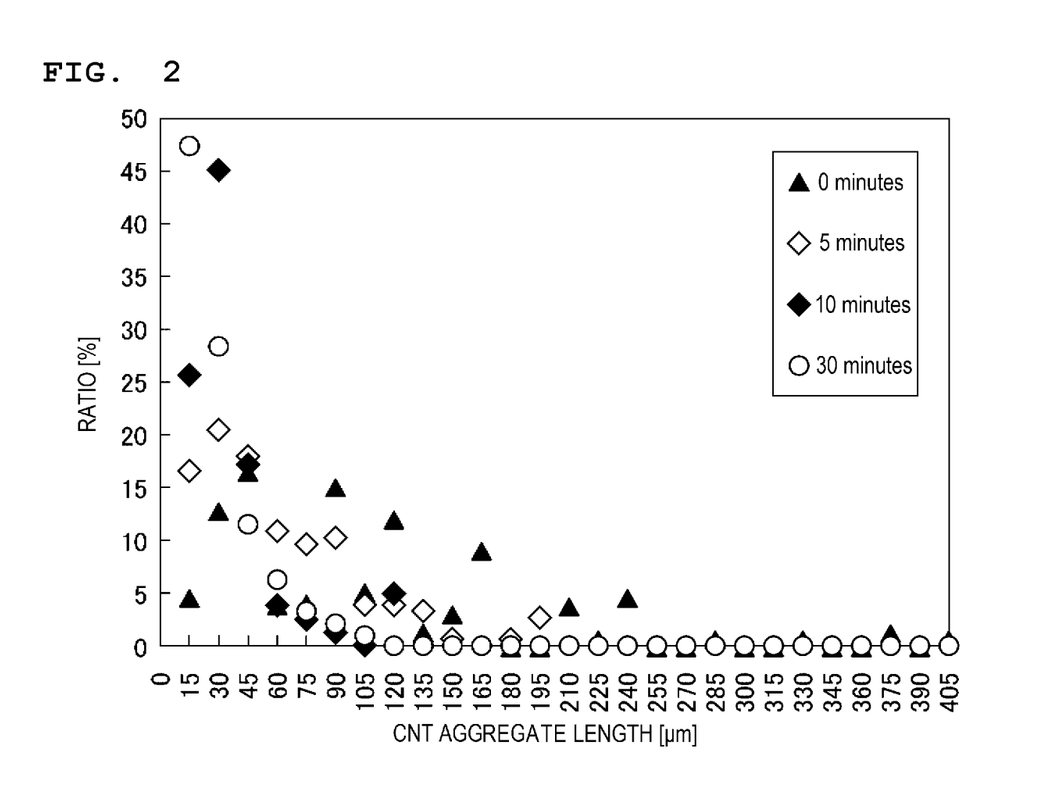
FIG. 2 is a graph showing the ratio of the lengths of the CNT aggregates after the first dispersion treatment.

After the first dispersion treatment was performed for a predetermined time, the length of the CNT aggregates in the sample was determined. The ratio is shown in the graph of FIG. 2. The graph of FIG. 2 also shows the ratio of the lengths of the CNT aggregates in the sample before the first dispersion treatment (0 minutes). The length of the CNT aggregates was determined based on microscopic observation. Specifically, the length of the CNT aggregates observed in a predetermined region of an optical micrograph at a magnification of 1000 times was measured in an observable range. The lower limit of measurement is about 4 μm.

The measured length was divided into predetermined sections to obtain a frequency distribution, and the ratio of the number of CNT aggregates included in each section was calculated. The plot in the graph of FIG. 2 is the ratio of the CNT aggregates having the length of each predetermined section. For example, the plot at a CNT aggregates length of 15 μm corresponds to the ratio of CNT aggregates having a length of 15 μm or less. It is assumed that this section includes CNT aggregates having a length of 1 μm or more and 15 μm or less. Also, the plot at 30 μm corresponds to the ratio of CNT aggregates having a length of more than 15 μm and 30 μm or less, and the plot at 45 μm corresponds to the ratio of CNT aggregates having a length of more than 30 μm and 45 μm or less.

In addition, the abundance ratio of the CNT aggregates having a length of more than 15 μm and 105 μm or less was determined in the same region of the optical micrograph. The results are summarized in Table 1 below, along with the average length and the standard deviation of the length of the CNT aggregates. The average length and the standard deviation of the length of the CNT aggregates were calculated from the frequency distribution described above. For the calculation of the average length and the standard deviation, the upper limit length of each section shown on the horizontal axis of the graph of FIG. 2 was used.

Further, for the CNT aggregates in the sample before and after the first dispersion treatment, the abundance ratio (X μm or less:more than X μm (X=75, 90, 105)) with a predetermined length as a boundary was determined and summarized in Table 2 below.

TABLE 1

|  | 0 min. | 5 min. | 10 min. | 30 min. |
| --- | --- | --- | --- | --- |
| Abundance ratio of more than 15 μm and 105 μm or less | 56% | 85% | 95% | 99% |
| Average length (μm) | 101.4 | 59.4 | 36.0 | 30.0 |
| Standard deviation (μm) | 77.4 | 40.9 | 24.1 | 19.7 |

TABLE 2

|  | 0 min. | 5 min. | 10 min. | 30 min. |
|---|---|---|---|---|
| 75 μm or less:more than 75 μm | 38:62 | 66:34 | 92:8 | 94:6 |
| 90 μm or less:more than 90 μm | 41:59 | 75:25 | 94:6 | 97:3 |
| 105 μm or less:more than 105 μm | 56:44 | 85:15 | 95:5 | 99:1 |

As shown in FIG. 2 and Tables 1 and 2, the sample before the first dispersion treatment (0 minute) has a large variation in length of the CNT aggregates. It is shown in FIG. 2 and Tables 1 and 2 that the first dispersion treatment using the colloid mill shortens the CNT aggregates and reduces the variation in length.

As the time of the first dispersion treatment increases, the proportion of short CNT aggregates increases. The content of the CNT aggregates of more than 105 μm was 44% before the treatment, but was reduced to 1% by performing the first dispersion treatment for 30 minutes.

Figure 3:
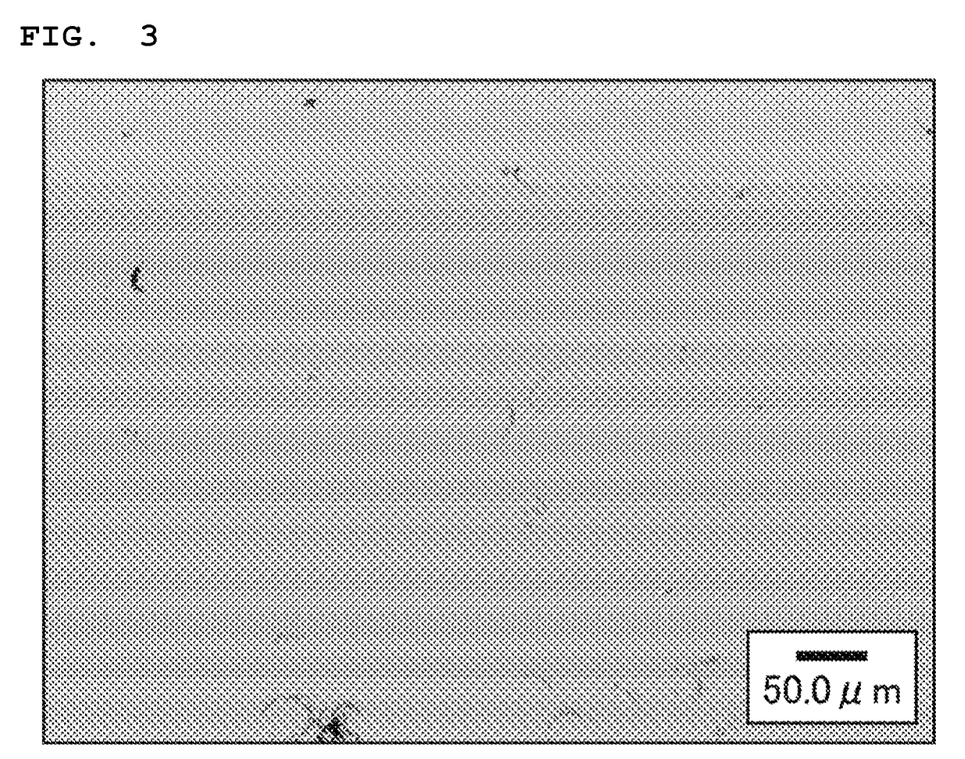
FIG. 3 is an optical micrograph of CNT aggregates after the first dispersion treatment.

FIG. 3 is an optical micrograph of the CNT aggregates in the sample after performing the first dispersion treatment for 30 minutes. It can be seen that the average length of the CNT aggregates is shortened to about 40 μm or less and the CNT aggregates tend to be loosened by the first dispersion treatment using the colloid mill. In the optical micrograph of FIG. 3, a large number of CNT aggregates in a loosened state are confirmed.

<Preparation of Dispersion and Evaluation of CNT Length>

Dispersions (Examples 1 and 2, Comparative Example) are prepared using the above-described nanocarbon material, and the length of CNTs in the obtained dispersions is examined and compared.

The dispersion of Example 1 was prepared by subjecting the same sample as described above to the first dispersion treatment and the second dispersion treatment. The first dispersion treatment was performed at a gap of 300 μm and 16000 rpm for 10 minutes using the above-described colloid mill (IKA Japan K.K., majic LAB).

The sample after the first dispersion treatment was subjected to a high-pressure dispersion treatment to perform the second dispersion treatment. In the high-pressure dispersion treatment, a high-pressure homogenizer was used, and circulation was performed 5 times at 100 MPa.

In the nanocarbon material in the dispersion of Example 1 thus obtained, CNT aggregates were partially confirmed, but most of the CNT aggregates were loosened.

The dispersion of Example 2 was prepared in the same manner as in Example 1 except that the gap was changed to 40 μm and the treatment time was changed to 30 minutes in the first dispersion treatment. As in Example 1, CNT aggregates were partially confirmed in the nanocarbon material in the dispersion of Example 2, but most of the CNT aggregates were loosened.

The dispersion of Comparative Example was prepared in the same manner as in Example 1 except that the first dispersion treatment was not performed.

Figure 4:
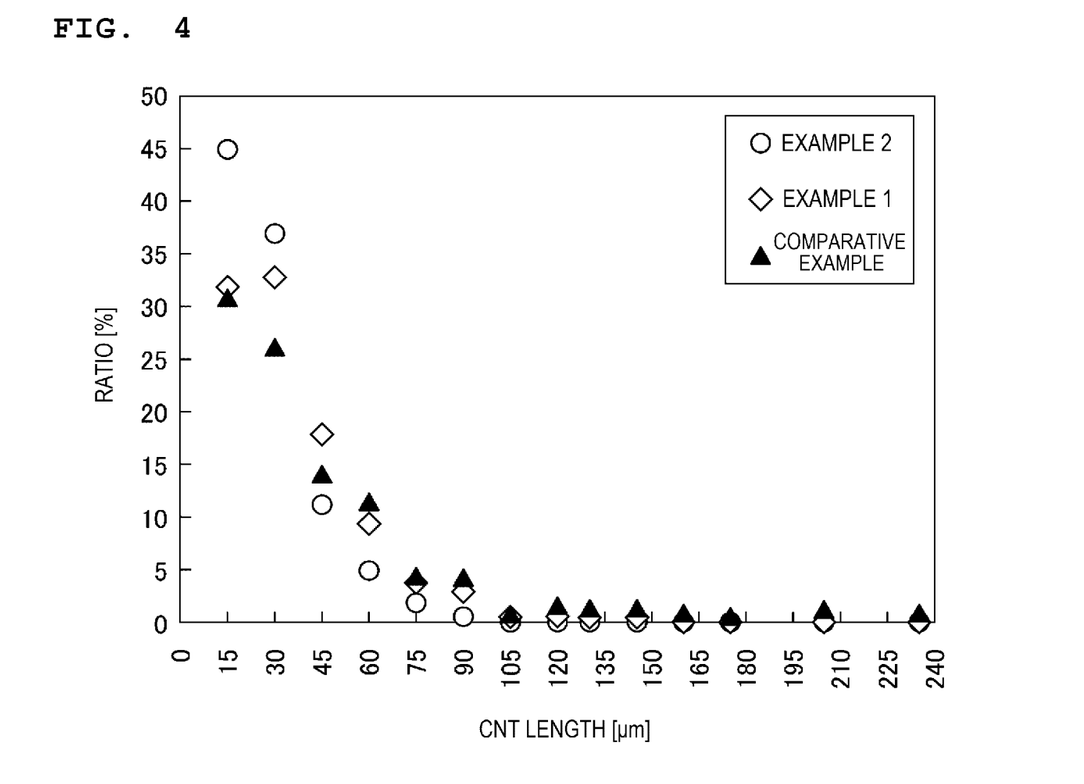
FIG. 4 is a graph showing the ratio of the lengths of the CNTs after the second dispersion treatment.

The lengths of the CNTs in the dispersions of Examples 1 and 2 and Comparative Example were determined and the ratios are shown in the graph of FIG. 4. The length of the CNT was determined based on microscopic observation as described above. In the same manner as described above, the measured length was divided into predetermined sections to obtain a frequency distribution, and the ratio of the number of CNTs included in each of the sections was calculated. Respective sections in the frequency distribution are 4 μm or more and 15 μm or less, more than 15 μm and 30 μm or less, more than 30 μm and 45 μm or less, more than 45 μm and 60 μm or less, more than 60 μm and 75 μm or less, more than 75 μm and 90 μm or less, more than 90 μm and 105 μm or less, more than 105 μm and 120 μm or less, more than 120 μm and 130 μm or less, more than 130 μm and 145 μm or less, more than 145 μm and 160 μm or less, more than 160 μm and 175 μm or less, more than 175 μm and 205 μm or less, more than 205 μm and 235 μm or less, more than 235 μm and 265 μm or less, and more than 265 μm and 295 μm or less.

As in the case of FIG. 2, each plot in FIG. 4 is a CNT having a predetermined length of each section. In addition, for the CNT aggregates after the first dispersion treatment and before the second dispersion treatment and the CNTs after the second dispersion treatment, the abundance ratio (X μm or less:more than X μm (X=75, 90, 105)) with a predetermined length as a boundary was determined. The results are summarized in Table 3 below.

TABLE 3

|  | Example 1 | | Example 2 | | Comparative Example | |
|---|---|---|---|---|---|---|
|  | Before treatment | After treatment | Before treatment | After treatment | Before treatment | After treatment |
| 75 μm or less:more than 75 μm | 82:18 | 92:8 | 94:6 | 98:2 | 38:62 | 82:18 |
| 90 μm or less:more than 90 μm | 88:12 | 95:5 | 96:4 | 99:1 | 41:59 | 87:13 |
| 105 μm or less:more than 105 μm | 95:5 | 98:2 | 99:1 | 100:0 | 56:44 | 91:9 |

In Table 3, the results of the CNT aggregates after the first dispersion treatment and before the second dispersion treatment are shown as (before treatment), and the results of the CNTs in the dispersion obtained after the second dispersion treatment are shown as (after treatment).

In Examples 1 and 2, since the first dispersion treatment is performed, the variation in length of the CNT aggregates is suppressed even before the second dispersion treatment. Table 3 shows that the variation in length of the CNT is further suppressed after the second dispersion treatment. It can also be seen from FIG. 4 that the variation in length of the CNTs in the dispersions of Examples 1 and 2 is small.

For the CNTs in the dispersions of Examples 1 and 2, and Comparative Example, the standard deviation of the length was determined from the frequency distribution using the upper limit length of each section in the same manner as described above. The standard deviation of the length of the CNT was 23 μm in Example 1, 15 μm in Example 2, and 42 μm in Comparative Example. The average lengths of the CNTs in the dispersions of Examples 1 and 2 and Comparative Example were 35.8 μm, 27.4 μm, and 47.0 μm, respectively.

As shown in the results of Comparative Example, when the second dispersion treatment by high-pressure dispersion is performed without performing the first dispersion treatment, the variation in length of the CNT cannot be suppressed. In the dispersion of Comparative Example, only 82% of the CNTs have a short length of 75 µm or less, and 9% of the CNTs have a length of more than 105 µm.

The average aspect ratio of the nanocarbon material in the dispersion was about 6000 in Example 1, about 4500 in Example 2, and about 3500 in Comparative Example. The average aspect ratio was determined by averaging the measured aspect ratios of the CNTs. The diameter was measured using a TEM photograph.

<Evaluation by Raman Spectrum Analysis>

The above-described nanocarbon material was used as Sample 1 for Raman spectrum analysis.

The same nanocarbon material was treated as follows to prepare Sample 2 and Sample 3 for Raman spectrum analysis.

In the preparation of Sample 2, a mixture of 0.15 g of nanocarbon material in 500 g of water was treated with the colloid mill described above (gap of 40 µm, 16000 rpm, 30 minutes). The mixture after the treatment was dropped onto a glass substrate and dried at 90° C. to obtain Sample 2 for Raman spectrum analysis.

In the preparation of Sample 3, the same mixture as in the case of Sample 2 was treated only with a high-pressure dispersing apparatus without using a colloid mill (pressure: 100 MPa, circulation frequency: 5 times). The mixture after the treatment was dropped onto a glass substrate and dried at 90° C. to obtain Sample 3 for Raman spectrum analysis.

Each of Samples 1 to 3 was subjected to Raman spectrum analysis 2 times, and the peak intensity ratio (G/D ratio) between the G-band and the D-band in the spectrum was determined. The results are summarized in Table 4 below.

TABLE 4

|  |  | Sample 1 | Sample 2 | Sample 3 |
|---|---|---|---|---|
| G/D ratio | First time | 1.21 | 1.18 | 1.08 |
|  | Second time | 1.33 | 1.11 | 0.96 |
|  | Average | 1.27 | 1.15 | 1.02 |

As shown in Table 4, the G/D ratio tends to decrease after high-pressure dispersion treatment (Sample 3), but tends to be maintained after treatment with a colloid mill (Sample 2). Since the G/D ratio equivalent to that in the untreated state can be maintained, it can be seen that the first dispersion treatment using the colloid mill does not excessively increase the surface defects of the CNTs.

Sample 2 treated with the colloid mill is in a state in which the CNT aggregates in the nanocarbon material are easily loosened. When the high-pressure dispersion treatment is performed on Sample 2, the CNT aggregates are easily loosened, and thus the CNT aggregates can be loosened and dispersed even if the number of times of the high-pressure dispersion treatment is small. Since the possibility that defects on the CNT surface increase is small, a decrease in the peak intensity ratio (G/D ratio) between the G-band and the D-band in the Raman spectrum can be suppressed.

5. Modified Example

The present invention is not limited to the above-described embodiment, and can be appropriately modified within the scope of the present invention.

The first dispersion treatment can be performed by any method as long as the CNT aggregates in the nanocarbon material can be shortened and the length of 95% or more thereof can be adjusted to 1 µm or more and 105 µm or less. In the first dispersion treatment, a homogenizer may be used in addition to the colloid mill.

Further, the first dispersion treatment can be performed by mixing the nanocarbon material containing the CNT aggregates with a solvent such as dimethylacetamide (DMAc) and kneading the mixture for a predetermined time under predetermined conditions.

The invention claimed is:

1. A carbon nanotube dispersion comprising:
   a dispersion medium; and
   a nanocarbon material containing carbon nanotubes dispersed in the dispersion medium, wherein
   98% or more of the nanocarbon material has a length of 1 µm or more and 105 µm or less and the nanocarbon material has an average aspect ratio of 100 or more and 20000 or less.

2. The carbon nanotube dispersion according to claim 1, wherein the nanocarbon material has a standard deviation of the length of 40 µm or less.

3. A method for producing a carbon nanotube dispersion, comprising:
   performing a first dispersion treatment on a nanocarbon material containing an aggregates of carbon nanotubes to adjust a length of 95% or more of the nanocarbon material to 1 µm or more and 105 µm or less; and
   performing a second dispersion treatment on the nanocarbon material after the first dispersion treatment to loosen at least a part of the aggregates, wherein
   98% or more of the obtained nanocarbon material has a length of 1 µm or more and 105 µm or less and the obtained nanocarbon material has an average aspect ratio of 100 or more and 20000 or less.

4. The method for producing a carbon nanotube dispersion according to claim 3, wherein the first dispersion treatment is performed by using a colloid mill or a homogenizer.

5. The method for producing a carbon nanotube dispersion according to claim 4, wherein the second dispersion treatment is a high-pressure dispersion treatment.

6. The method for producing a carbon nanotube dispersion according to claim 3, wherein 10% or more of the nanocarbon material before the first dispersion treatment has a length of more than 105 µm.

* * * * *